United States Patent [19]

Arnold et al.

[11] E Re. 29,007

[45] Reissued Oct. 19, 1976

[54] APPARATUS FOR DEVELOPING WINDING COILS

[75] Inventors: Richard B. Arnold; Dallas F. Smith, both of Fort Wayne, Ind.

[73] Assignee: General Electric Company, Fort Wayne, Ind.

[22] Filed: May 9, 1975

[21] Appl. No.: 576,179

Related U.S. Patent Documents

Reissue of:

[64] Patent No.: 3,732,897
Issued: May 15, 1973
Appl. No.: 130,399
Filed: Apr. 1, 1971

[52] U.S. Cl. ..... 140/92.1
[51] Int. Cl.[2] ..... B21F 3/04
[58] Field of Search ..... 140/1, 92.1, 92.2; 242/25, 47.01, 78, 82; 57/71; 74/800

[56] References Cited

UNITED STATES PATENTS

| | | | |
|---|---|---|---|
| 1,187,827 | 6/1916 | Gibbs | 242/82 |
| 2,445,109 | 7/1948 | Ferguson | 242/7.09 |
| 2,699,690 | 1/1955 | Kobler | 74/800 |
| 2,836,204 | 5/1958 | Mason | 140/92.1 |
| 2,889,610 | 6/1959 | Buddecke | 140/92.2 |
| 3,387,634 | 6/1968 | Hilsenberg | 140/92.2 |
| 3,481,372 | 12/1969 | Emlinger et al. | 140/92.1 |
| 3,522,650 | 8/1970 | Cutler et al. | 29/596 |
| 3,532,005 | 10/1970 | Bremner et al. | 74/640 |
| 3,538,959 | 11/1970 | Eminger | 140/92.1 |
| 3,579,791 | 5/1971 | Arnold | 140/92.1 |
| 3,625,261 | 12/1971 | Hill et al. | 140/92.1 |

FOREIGN PATENTS OR APPLICATIONS

| | | | |
|---|---|---|---|
| 1,045,343 | 12/1958 | Germany | 242/82 |
| 852,297 | 10/1960 | United Kingdom | 57/58.3 |

*Primary Examiner*—Lowell A. Larson
*Attorney, Agent, or Firm*—Ralph E. Krisher, Jr.

[57] ABSTRACT

A high speed winding machine for developing or generating coil groups each comprising one or more coils each having one or more turns of winding material. The turns are developed and placed on coil turn receiving means such as coil injection tooling or a coil transfer mechanism with or without auxiliary coil shaping means. The apparatus may be advantageously utilized in the manufacture of wound inductive devices, e.g., dynamoelectric machines such as motors. An illustrated preferred embodiment includes a frame, a coil form support having auxiliary coil shaping means embodied as a coil form mounted thereon for axial movement relative to the frame, and a flyer rotatable about a central axis for developing wire turns on the coil form. In order to prevent rotation of the coil form, located in the vicinity of the central axis, with the rotating flyer and a rotating wire feed tube, a migrating mechanical linkage is provided between the frame and coil form support to prevent rotation of the coil form with the rotating flyer. The illustrated migrating linkage includes a carriage which supports a wobble face gear and is rotatable relative to the gear. The wobble gear is provided with teeth on opposite faces thereof and the teeth on one face of the wobble gear mesh with the stationary gear teeth on the frame while teeth on the other face of the wobble gear engage the gear on the coil form support. The stationary gear teeth and gear teeth on the coil form support are spaced apart and the wobble gear extends between the spaced gears so that portions of the wobble gear spaced 180° apart engage the stationary gear teeth and gear teeth on the coil form, respectively. The wobble gear carriage is canted relative to the central axis and as it rotates it drives succeeding teeth on the faces of the wobble gear into engagement with succeeding ones of the stationary and coil form support gear teeth. As the carriage rotates with the flyer, the wobble gear executes a rotationless wobble motion synchronized with the flyer. This motion results in a moving shutter, synchronized with the flyer, through which wire is fed to the flyer.

10 Claims, 5 Drawing Figures

Inventors:
Richard B. Arnold,
Dallas F. Smith,
By Ralph E. Kusher Jr.
Attorney.

Inventors:
Richard B. Arnold,
Dallas F. Smith,
By Ralph E. Kusher Jr.
Attorney.

Inventors:
Richard B. Arnold,
Dallas F. Smith,
By Ralph E. Fischer Jr.
Attorney.

APPARATUS FOR DEVELOPING WINDING COILS

Matter enclosed in heavy brackets [ ] appears in the original patent but forms no part of this reissue specification; matter printed in italics indicates the additions made by reissue.

BACKGROUND OF THE INVENTION

The present invention relates generally to improved apparatus for developing one or more coils in one or more coil groups and more particularly to a machine for developing coils that may be used as the winding in an inductive device, one example of which [ are ] *is a* dynamoelectric machine winding. More specifically, the present invention relates to high speed winding equipment having means for synchronizing a wire accommodating opening or shutter with movement of a flyer.

One prior art winding machine arrangement is illustrated in Smith U.S. Pat. No. 3,510,939. This patent illustrates winding coils on a coil form which is supported by an axially movable support member which in turn is coaxial with and internal to a flyer drive shaft. A flyer coupled with the drive shaft is rotatable about a central axis and develops coils of wire on the coil form. Developed coil turns are transferred from the free end of the coil form to a coil receiver either while other turns in the same coil are being developed or upon completion of the development of a given coil.

After having received the coil turns, the coil receiver is moved to a coil inserting or coil inject machine such as that disclosed in the Hill U.S. Pat. No. 3,324,536. Since a number of different size coils for a given coil group to be used to form one pole of an electric motor are often developed on a single form, the coil form is provided with steps or stages and relative axial movement between the form and flyer is effected so as to develop the different coils within a coil group.

In the aforementioned Smith machine, the form is moved in several steps, and may begin with the form retracted toward the head structure of the machine. Then, as all of the turns for one coil are developed, the form would be moved one incremental step toward the coil receiver and the turns of a second coil would be developed. This stepping process would be repeated until a coil group for one pole would have been developed. This stepping process, of course, requires the coil form support structure to be movable axially.

The drive shaft which imparts rotary motion to the flyer is a tubular shaft surrounding the support shaft for the coil form and wire is fed from a wire source along this tubular drive shaft to the flyer. This wire feed path is preferably kept close to the axis of the flyer drive shaft and coil form support so as to prevent undue stresses caused by bending and/or twisting of the wire as the flyer and drive shaft rotate.

There have been provided a series of stops which establish and control the incremental axial movement of the coil form and relatively complex means for preventing rotation of the coil form support structure. One way to prevent the rotation of the coil form would be to provide a holding mechanism for cooperation with the free or unsupported end of the coil form, but such an arrangement would interfere with the desired interrelationships between the coil form and coil receiver and particularly would interfere with the movement of developed coil turns to the coil turn receiver.

In the aforementioned Smith patent one disclosed means for preventing rotation of a coil form included pairs of cam operated shuttle bars which sequentially locked the coil form support structure to the machine frame while providing a gap, between the coil form support structure and the machine frame opposite the instantaneous shuttle bar locking point, through which gap wire could be fed to the flyer. As the flyer rotated, the shuttle bars reciprocated between diametrically opposed locking points and thus accelerated in a first direction, stopped and latched, and then accelerated in a direction opposite to the first, stopped, and latched again for each revolution of the flyer. While quite effective, the stresses and vibrations due to inertial forces involved with this arrangement established, as a practical matter, an upper limit to the speed of operation of the entire apparatus.

Cam operated shuttle bars were also utilized, *to prevent rotation of a coil form with a flyer*, in our copending application Ser. No. 806,057, filed Mar. 11, 1969 and entitled METHOD AND APPARATUS FOR FORMING SHAPED INSULATORS AND FOR DEVELOPING COILS OF A MAGNETIC CORE. This application issued as U.S. Pat. No. 3,579,818 on May 25, 1971. [To prevent rotation of a coil form with a flyer as] *As* disclosed in our copending application, a coil form cooperates with an insertion tooling mechanism, e.g., injection tooling. It will be appreciated that, in addition to limiting speed of operation, linearly reciprocating shuttle bars will also be a continuing cyclical stress generating source at all speeds of operation and will thus have a tendency at least to be a source of undesired noise as well as vibrations which can have a continuing deleterious affect over a period of time on other parts of the apparatus, including for example, hydraulic and pneumatic seals and connections, electrical connections, and mechanical elements and adjustments.

Although the foregoing background description has been in connection with apparatus and methods that are of particular utility in the dynamoelectric machine winding art, it will be appreciated that it would be desirable to provide an improved machine that may be utilized to overcome similar or related problems in other applications.

Accordingly, it is a general object of the present invention to provide a winding machine capable of greater operational speeds than heretofore.

It is another object of the present invention to provide a winding machine wherein a mechanism provides a continuously moving opening for the movement of winding material therethrough with the mechanism stopping and starting only when a winding flyer stops and starts.

Still another object of the present invention is to provide a machine having means extending between axially spaced apart first and second members for preventing relative rotation between the first and second members while allowing rotation of a wire handling structure which lies axially between the first and second members and extends radially beyond the axis of rotation of the wire handling structure.

It is a further object of the present invention to eliminate at least some of the inertial shock loads associated with reciprocating rotation preventing structures used heretofore with coil winding machines.

A more specific object of the present invention is to provide a moving shuttle mechanism movable continuously with the flyer of a winding machine through which winding material is fed to the flyer.

SUMMARY OF THE INVENTION

In accordance with one form of our invention, we have provided an improved machine for developing groups of coils of winding material wherein winding material is fed to a rotating flyer. The material is fed along a path generally parallel and in proximity to an axis of rotation of the machine and radially away from the axis of rotation between a first stationary machine element or mechanism and a second machine element or mechanism restrained from synchronous movement with the flyer by shutter means which extend between and constantly engage the first and second machine elements. In a preferred form, the first machine element includes a first meshing surface in the form of a face gear, held fixed relative to the machine frame. The second machine element includes a meshing surface in the form of a second face gear secured to a coil form, and the shutter means is in the form of an intermeshing member having two spaced apart oppositely facing surfaces each of which respectively engage and mesh with the face gears. With the two face gears lying in spaced apart parallel planes, the intermeshing member lies in a plane intersecting the two parallel planes and is supported by a [ nonrotatable ] *nonrotating* bearing race which is eccentrically supported relative to the axis of rotation by a bearing race which rotates in synchronism with the flyer. During machine operation, the [ nonrotatable ] *nonrotating* bearing race executes a rotationless wobble motion which is imparted to the intermeshing member. The intermeshing member then defines a shutter synchronously movable with the flyer, through which winding material is fed to the arm of the flyer. In this preferred embodiment, linearly reciprocating masses are avoided in the shutter defining means and undesirable ramifications thereof, such as vibration, and cyclical inertial stresses are substantially eliminated.

The subject matter which we regard as our invention is particularly pointed out and distinctly claimed in the concluding portion of the specification. Our invention itself, however, both as to its organization and method of operation, together with further objects and advantages thereof, may best be understood by reference to the following description taken in connection with the accompanying drawings.

DESCRIPTION OF THE PREFERRED EMBODIMENT

Figure 1:
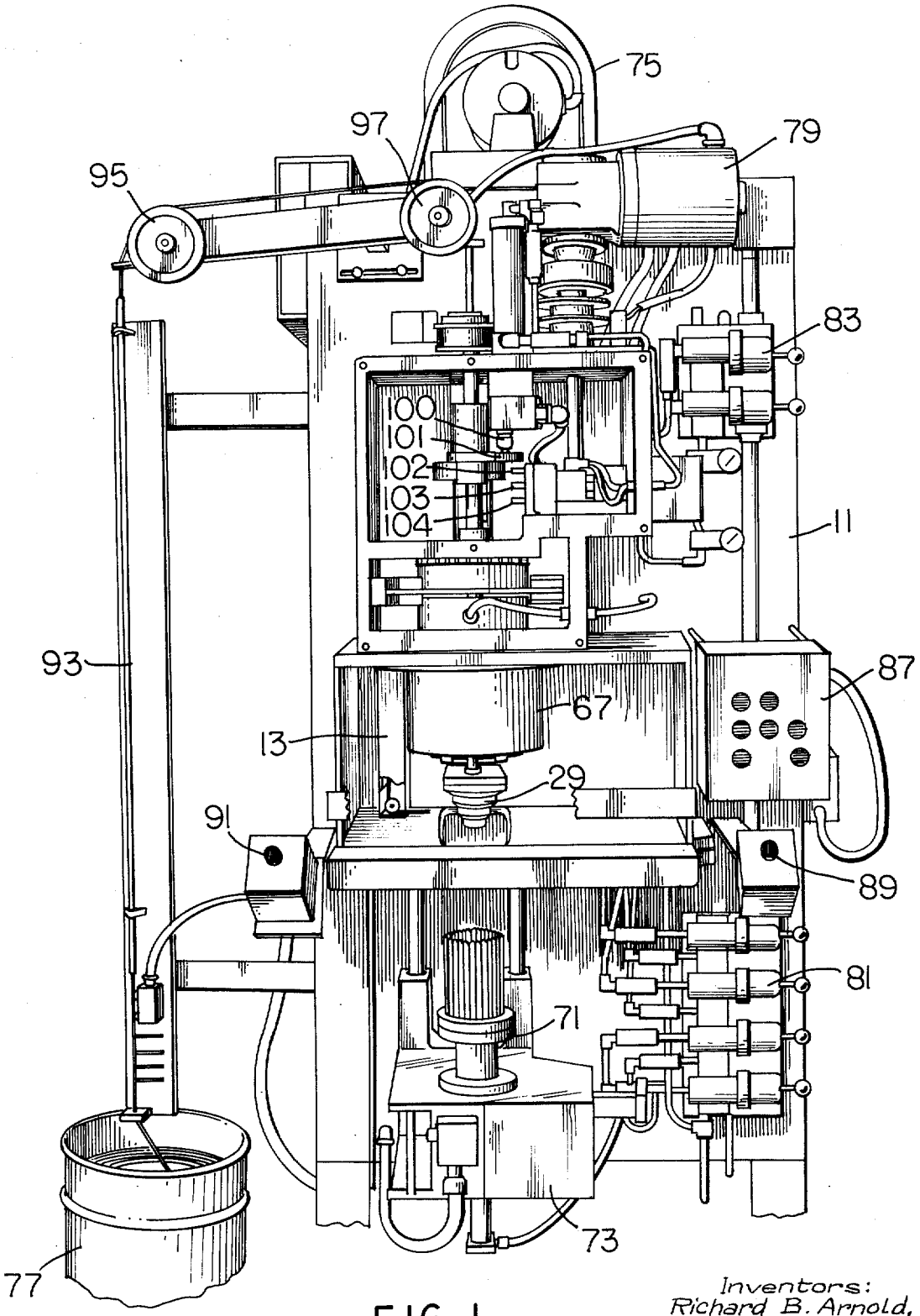
FIG. 1 is a front perspective view of a winding machine embodying the present invention in a preferred form.

With reference to FIG. 1, a coil winding machine particularly adapted for developing winding coil turns for dynamoelectric machine stators and embodying the present invention, in one form, includes a machine frame 11 which supports auxiliary coil shaping means illustrated as a coil form 29 about which flyer means including flyer arm 13 is rotatable. The axis of revolution 15 (best seen in FIG. 2) of the flyer 13 may be horizontal but as illustrated is vertical as in the case of the flyer in the apparatus shown in our aforementioned copending application, the entire disclosure of which application is specifically incorporated herein by reference. The coil form 29 of the machine 11 has sections for interfitting and cooperating with coil receiving means that, as illustrated, include the vertically extending blades of a coil transfer mechanism 71. This mechanism is supported by a vertically movable transfer mechanism support structure 73. The structure 73 is operative to raise the coil transfer mechanism into intermeshing relationship with the coil form 29 for receiving developed winding turns. When a coil group for one pole of a stator has been received in the transfer mechanism, the support structure 73 rotates the coil transfer mechanism in preparation for receiving the coils developed for another coil group.

When the transfer mechanism has received all of the coils which are to be subsequently assembled with a magnetic core, for example, inserted into the slots of a dynamoelectric machine core, the support 73 lowers somewhat so that the transfer mechanism 71 may be removed by an operator and transferred to a coil insertion station. Many of the principles of overall operation of the winding machine 11 are similar to those of the aforementioned Smith device although the machine axis 15 is vertical rather than horizontal and may, of course, include structural arrangements disclosed in our aforementioned copending application. For example, coil injection tooling or still other coil turn receiver means may receive coil turns developed from wire fed to the flyer 13.

A pair of electric motors 75 and 79 supply the power requirements of the present machine either by way of direct mechanical linkages such as a belt drive to the flyer mechanism 13 from the motor 75 or by a pneumatic system controlled for example by solenoid operated valves such as the valves in the valve banks 81 and 83 which serve to gate energy from a pressurized fluid supply to the pneumatically operated mechanisms within the machine 11. The pressure fluid system and controls in the machine 11 may be arranged for pneumatic or hydraulic operation, but in either case the physical operation and control is basically as described in Smith U.S. Pat. No. 3,510,939. The mechanism which rotates the transfer mechanism 71 is a pneumatic drive mechanism controlled by one of the valves in the valve bank 81 which, as will be understood, in turn is energized by a not shown logic circuit upon the completion of the development of a coil group. As best shown in FIG. 1, a pneumatic cylinder 100 is operative, upon actuation of the proper valve in valve bank 83, to drive a bearing plate 101 carried by the coil form jump tube 50 (better shown in FIG. 2) against retractable stops 102, 103, 104. During operation, the coil form or arbor 29 is jumped downwardly upon sequential retraction of the stops 102, 103, 104 which also are pneumatically controlled. As viewed in FIG. 1, however, the cylinder 100 has retracted the bearing plate 101 to its uppermost initial position. There are numerous other control functions performed in a complete cycle of operation of the machine 11. However, these other control functions either are well-known in the art or fully described in the aforementioned Smith patent and our copending application.

Also illustrated in FIG. 1 is a control panel 87 by means of which an operator may, for example, set the number of turns required for each coil in coil group. Machine operation is initiated by simultaneous two handed energization of the switches 89 and 91. A wire source such as a large drum 77 supplies wire along a wire guide 93 around two pulleys or other wire guides 95 and 97 and then downwardly substantially parallel to and adjacent to the axis 15 of rotation of the flyer 13 to the flyer.

Figure 2:
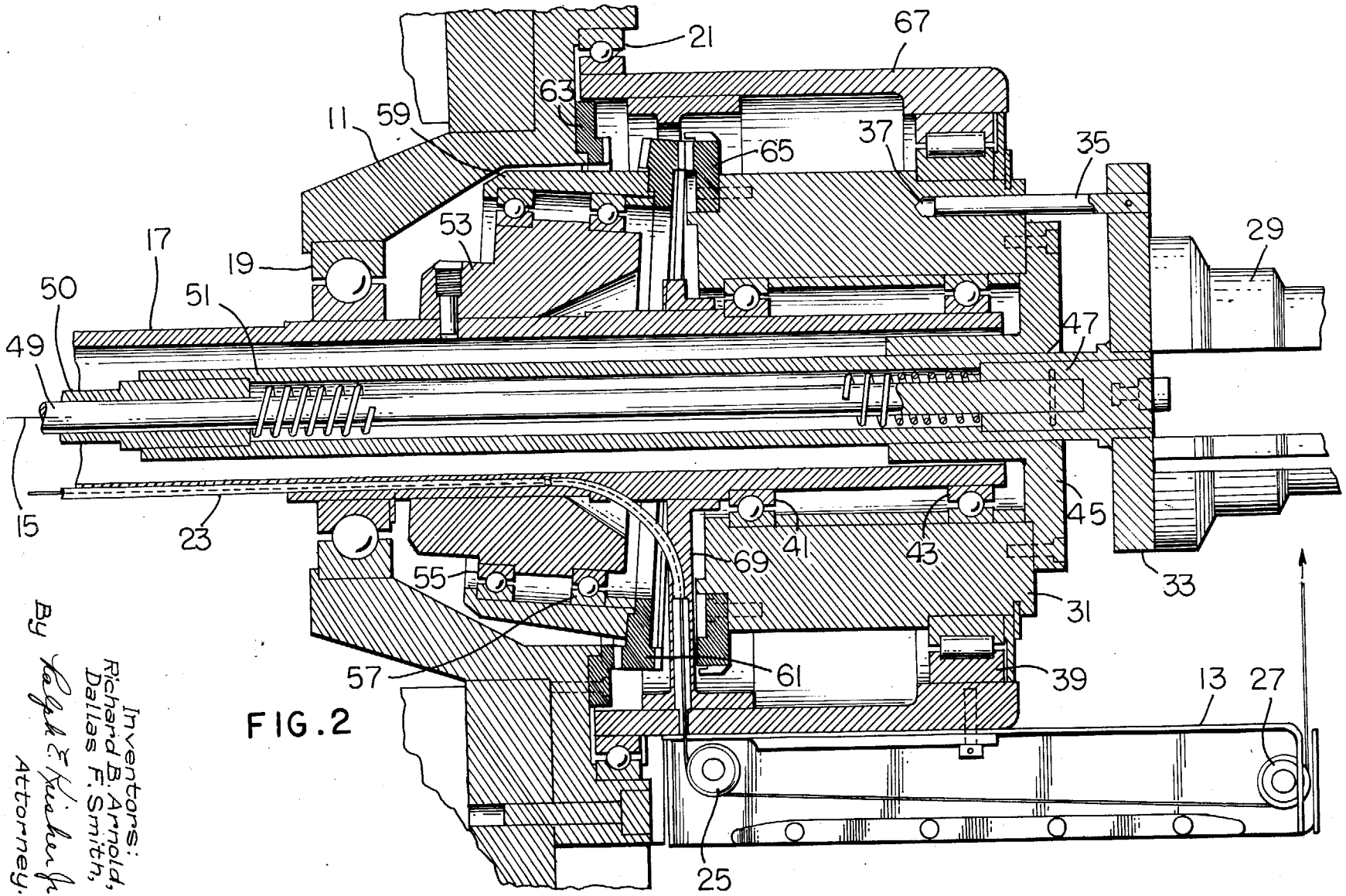
FIG. 2 is an elevational view partially in section, of the winding machine head portion of the machine shown in FIG. 1.
Figure 3:
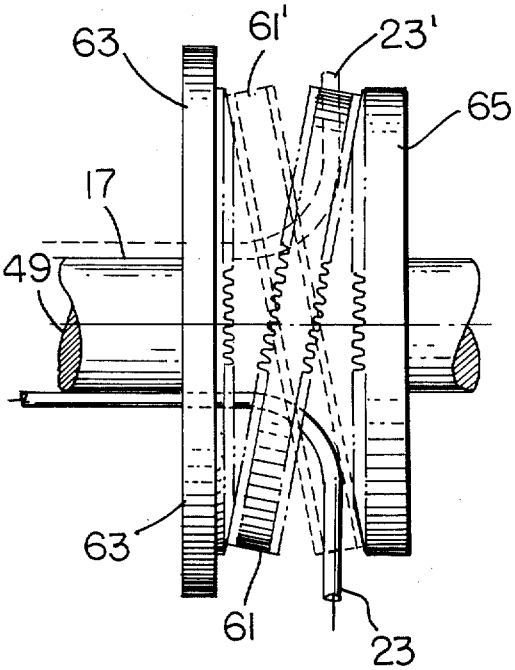
FIG. 3 is a somewhat perspective view representative of the motion which portions of the machine head shown in FIG. 2 undergo during machine operation.

Turning now to FIG. 2, the flyer 13 is rotatably driven about the axis 15 by a tubular flyer drive shaft 17 which in turn is driven, for example, by the electric motor 75 of FIG. 1. The entire flyer means including the flyer 13, the drive shaft 17 and flyer supporting structure 67 and 69 is illustrated cross hatched throughout in the same manner to more clearly show which portions of the machine rotate together. The entire flyer means is rotatably supported by the frame by way of rotary bearings 19 and 21. Wire from the source 77 shown in FIG. 1 is fed along the tubular drive shaft in a wire passage 23 which eventually bends and progresses radially outwardly along the structure which affixes or couples the actual flyer 13 to the flyer drive shaft 17. This wire feed path is then deviated twice within the flyer by two wire guides 25 and 27. From this last wire guide 27 the wire is fed as the flyer rotates and coil turns are developed about the coil form 29.

The coil form 29 is secured to a base 33 locked against rotation relative to a second member 31. The coil form base 33 is movable axially relative to the second member 31 but relative rotation of these two portions of the coil form support means is prevented by a pin 35 secured to the base 33 which mates with a corresponding hole 37 in the base 33 of the coil form support structure, the hole 37 extending sufficiently far into the second member 31 to allow the desired amount of relative axial motion between the members 31 and 33, and yet prevent any rotation therebetween. The coil form support structure 31 remains stationary while the flyer 13 rotates in order to promote the desired development of coil turns, this relative rotation being allowed while maintaining rugged support for the coil form and flyer by a series of rotary bearings 39, 41, and 43.

Sleeve bearings 45 and 47 allow relative axial motion between the base 33 and second member 31. An axial rod 49 is the innermost of a series of concentric members 49, 51, and 17 which extend generally along the axis 15. The axial rod 49 is movable axially relative to the coil form 29 to ensure that all of the coil turns developed during a coil winding cycle are received in the coil receiving means. The axial rod 49 and jump tube 51 may be moved together axially to move the coil form 29 axially relative to the flyer for winding coils having varying pitches or turn diameters on successive ledges of the coil form. The provision for this operation is also fully discussed in the aforementioned Smith patent. The last or outer axial tube 17 is, as presented earlier, supported for rotary motion about the axis 15 and does not undergo axial displacement.

In addition to supporting the flyer 13, the flyer drive shaft or outer axial tube 17 supports in a fixed manner an eccentrically mounted *carriage in the form of a* rotatable bearing support structure 53 which in turn supports the rotatable races for a pair of rotary bearings 55 and 57. This support structure or frame 53 is canted with respect to the axis 15 having its own axis inclined thereto at an angle of, about [ 5 ] *five* degrees which, as will be understood, may be varied as desired. The outer races of the bearings 55 and 57 rotatably support a collar 59 to which is affixed an annular member 61 having two oppositely facing meshing means that are illustrated in the form of annular gear teeth as readily seen in FIG. 5. Thus, as so far described, the frame 53 rotates with the tube 17 and due to the canted relationship of the frame 53 relative to the axis 15, the high and low points of the frame 53 relative to the coil form 31, will rotate about the axis 15.

The annular member 61 will execute a wobbling nonrotary motion about the tubular flyer drive shaft 17 as the shaft rotates. This motion is nonrotary because the member 61 is locked against rotation by reason of its engagement with stationary meshing means shown as the face gear 63 secured to the machine frame. The face gear 63 gear surface is substantially perpendicular to and centered about the axis 15. It will be understood that the intermeshing surfaces or teeth on the members 61 and 63 may be a series of spherical protrusions and corresponding spherical indentations or other slip preventing meshing surface configurations.

The first portion of the coil form support member 31 is provided with a meshing surface in the form of a toothed surface 65 of annular configuration which meshes with the lower toothed surface of the annular member 61 as viewed in FIG. 2. By this means, the coil form is restrained from rotating with the flyer assembly.

The flyer 13 is supported on a drum like structure 67 having an end 69. This end 69 is not radially symmetrical but rather, in the position illustrated in FIG. 2, has portions removed to allow the facing teeth of the gears 61 and 65 to intermesh while the diametrically opposite teeth on the gear 61 intermesh with the gear 63. While in this position, there is sufficient room between the face of gear 61 and the gear 65 at the left side of FIG. 2 to allow the wire guide portion of support end 69 to pass between the gears 61 and 65. This portion of end 69 is attached to the flyer drive shaft 17 and the flyer 13. As illustrated, this region between the gears 61 and 65 may be utilized as an open shutter for feeding wire radially outwardly relative to axis 15 and between the gears 61 and 65. The wire feed path 23 extends from the wire source 77 along the flyer drive shaft 17 through the annular gear structure 61 and then radially outwardly along the flyer support 69 to the flyer.

Imagine now that the flyer drive shaft 17, flyer 13, and all parts mechanically coupled thereto execute a 180° of revolution about the axis 15 from the position illustrated in FIG. 2. Under these circumstances, the flyer support structure 69 and the radially extending portion of the wire passageway 23 would be on the right-hand side of FIG. 2 as shown in broken lines in FIG. 2 and due to the 180° revolution of the support 53 the annular member 61 would be contacting the gear surface 63 at the right-hand side of FIG. 2 and contacting the gear surface 65 at the left-hand side of FIG. 2. Viewed in this manner, it is readily seen that the supported annular member 61 forms a shutter which rotates synchronously with the flyer assembly. It should also be clear that regardless of the particular rotational orientation of the flyer and related parts the gears 61, 63 and 65 are always intermeshed. Since the annular gear 61 always contacts each of the gears 63 and 65, it prevents rotation of the coil form 31 relative to the frame 11.

Figure 4:
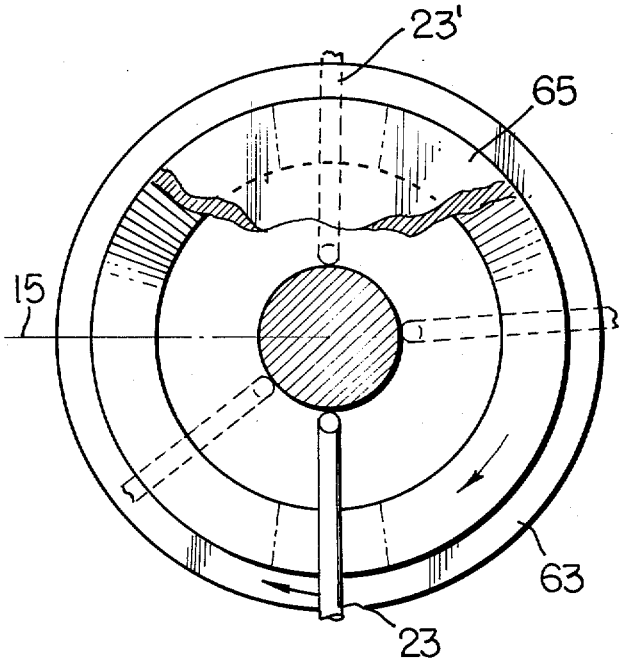
FIG. 4 is a view, partially in section, taken in the direction of the line 4—4 in FIG. 3.
Figure 5:
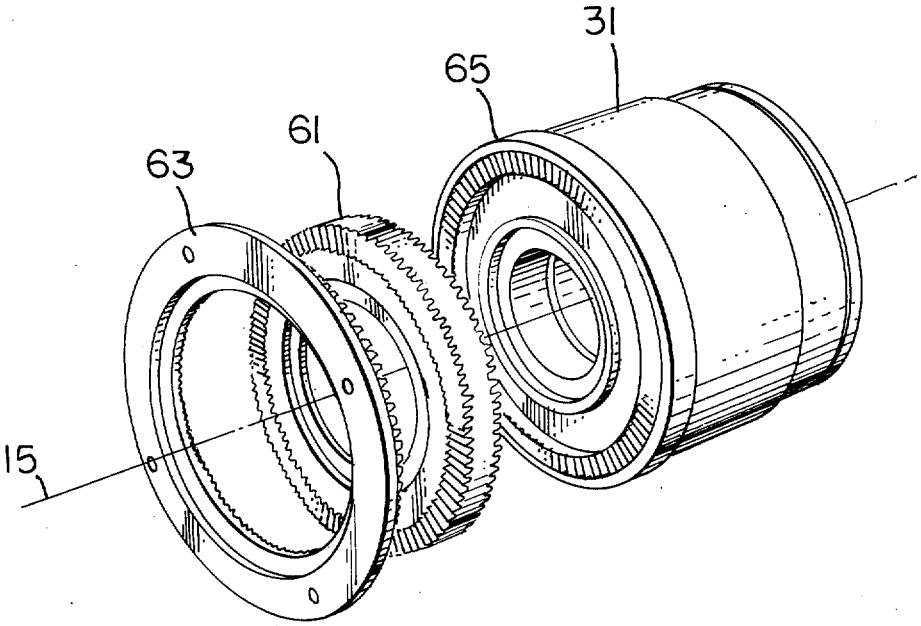
FIG. 5 is an exploded perspective view of the machine elements shown in FIG. 3.

FIGS. 4 and 5 show the flyer drive shaft 17 and the three related annular surfaces 63, 61, 65 which in the present preferred embodiment are gears, in the relative orientation shown in FIG. 1 as well as the orientation 180° removed therefrom and discussed above. These two figures illustrate clearly that at all times the wire passage 23 extends radially between the shutter defining members 61, 65. Thus, a nonrotary wobble motion on the part of the annular member 61 is synchronized with the movement of the wire passage and flyer.

It should now be apparent that the illustrated embodiment includes a migrating linkage that prevents rotation between two members and yet allows winding material to pass radially outwardly of and between these two members in synchronization with the migration of the linkage.

Numerous modifications of the disclosed preferred embodiment will be apparent to those of ordinary skill in the art having the present disclosure before them.

For example, referring to FIG. 4, all four toothed gear surfaces are illustrated as having the same general configuration and pitch, but, the intermeshing portions of gears 61 and 63 might for example have a pitch half that of the intermeshing portions of the gears 61 and 65. Furthermore, the gear 61 might be deleted and in its place a pair of intermeshing gears be provided having two parallel axes that are perpendicular to the machine axis 15. One of these gears would mesh with the gear surface 63 and the other gear would mesh with the gear surface 65. The carriage for these two gears would, of course, be supported on the flyer drive shaft 17 for rotation therewith so that the axes of the gears would move through two parallel planes perpendicular to the axis 15.

On the other hand, a pair of gears locked or keyed on a common shaft which is parallel to but removed from the machine axis 15 could be used so long as the pair of gears is supported by and rotates with the flyer structure and each meshes with a gear structure on the frame and coil form support. In still another form, strain wave gearing techniques may be utilized. For example, a deformable gear might be forced into intermeshing relationship with a nondeformable gear by a gear deformer carried by the flyer mechanism, or a flexible spline arrangement may be used.

The foregoing as well as other modifications should now readily suggest themselves to those of ordinary skill in the art and accordingly, the scope of the present invention should be measured only by that of the appended claims.

What we claim as new and desire to secure by Letters Patent of the United States is:

[1. Apparatus for developing turns of winding material for ultimate assembly with a magnetic core, the apparatus comprising a machine frame; flyer means rotatable about a first axis of rotation for developing winding turns about the first axis or rotation; winding material guiding means directing winding material in a direction generally radially relative to the first axis of rotation; a drive member rotatable about the first axis of rotation and extending longitudinally in the direction of the first axis of rotation for supplying motive power to the flyer means; a first device including coil shaping means about which at least a portion of the flyer means is movable; and meshing means interconnecting said first device and machine frame for locking said coil shaping means against rotation about the first axis of rotation during movement of the flyer means and for establishing an unobstructed generally radially directed shutter passage, continuously movable along a predetermined path in synchronism with the flyer means, through which winding material may be fed generally radially relative to the first axis of rotation; said meshing means including first and second members spaced axially apart along the first axis and wobble means; the first member being secured against rotation relative to the machine frame and having a meshing surface extending around the first axis; the second member being secured against rotation relative to the coil shaping means and having a meshing surface extending around the first axis; and said wobble means meshing continuously with the meshing surfaces of the first and second members and constraining the second member from rotation about the first axis relative to the first member; said wobble means including carrier having first and second bearing parts concentrically disposed about a second axis disposed in non-parallel relation to the first axis of rotation, the first bearing part being locked for rotation with said drive member and the second bearing part being constrained from rotation by the meshing of the wobble means and the first member; rotation of the first bearing part relative to the second bearing part causing the second bearing part to execute a rotationless wobble motion during rotation of the flyer means; said guiding means, wobble means, and flyer means all being movable in synchronism with one another, with the wobble means establishing the unobstructed substantially radially directed shutter passage for winding material being fed generally radially between the axially spaced apart first and second members.]

[2. The structure of claim 1 wherein the first and second members each include a gear face comprised of a plurality of gear teeth and the wobble means includes gear teeth meshed with the gear teeth of the first and second members.]

[3. The structure of claim 1 wherein the first member comprises a first gear face, the second member comprises a second gear face, and the wobble means comprises at least one pair of gear faces supported by the carrier and interconnected to prevent relative movement there-between, said at least one pair of gear faces comprising third and fourth gear faces; the first and third gear faces each having the same number of teeth and meshing with one another, and the second and fourth gear faces each having the same number of teeth and meshing with one another.]

[4. The structure of claim 1 wherein the coil shaping means and flyer means are relatively movable in an axial direction.]

[5. The structure of claim 1 wherein the first and second bearing parts mutually trap a plurality of antifriction bearing members.]

[6. Apparatus for developing turns of winding material for ultimate assembly with a magnetic core, the apparatus comprising a machine frame; flyer means for developing winding turns about a first axis of rotation; a first mechanism about which a portion of the flyer means is movable; means for locking said first mechanism against angular movement relative to the frame, and for establishing a shutter opening, continuously movable along a predetermined path in synchronism with the flyer means, through which segments of winding material may be fed from a first region proximate to the first axis to a second region spaced a different radial distance from the axis than the first region; a first gear surface carried by the machine frame; a second gear surface carried by the first mechanism; the means for locking including a locking structure comprising a single carriage and at least one pair of gear surfaces comprising third and fourth gear surfaces supported by said carriage; the third gear surface meshing with the first gear surface, and the fourth gear surface meshing with the second gear surface; the flyer means including a flyer drive shaft rotatable about the first axis of rotation, the carriage including a bearing structure having first and second bearing races with the first bearing race secured to the flyer drive shaft, and the third and fourth gear surfaces being fixed together to prevent relative motion therebetween and being supported, in oppositely facing relationship, from the second bearing race; said bearing races being relatively movable about a second axis of rotation disposed at a preselected angle relative to the first axis of rotation, whereby the third and fourth gear surfaces execute a rotationless wobble motion as the flyer drive shaft rotates and whereby winding material may be moved generally axially along the first region and radially away from the first axis and toward the second region along an angularly moving passageway extending between the first mechanism and machine frame.]

[7. The structure of claim 6 wherein the first and second bearing races are concentrically supported relative to the second axis of rotation and the first and second bearing races are supported from the flyer drive shaft eccentrically relative to the first axis of rotation.]

[8. A winding machine for generating turns of winding material about form means, the machine comprising a frame; winding turn generating means comprising a shaft supported by the frame for rotation about a first axis of rotation, a flyer arm spaced from the shaft a preselected radial distance and rotatable with the shaft in a predetermined path, and a winding material passage for winding material having a first portion extending in a generally axial direction along the shaft and a second portion located axially between a predetermined portion of the frame and the form means, and extending generally radially toward the flyer arm; said form means including a coil form disposed axially beyond the generally radially extending second portion of the passage; and locking means for preventing rotational movement of the form means about the first axis of rotation while establishing an opening, continuously and synchronously movable with the flyer arm, along which a portion of the winding material may extend; said locking means including a first gear surface fastened in stationary relationship with the predetermined portion of the frame, a second gear surface interconnected with said coil form to prevent relative rotation between said second gear and coil form, and other gear means extending between the first and second gear surfaces; said first and second gear surfaces being spaced apart axially along the first axis; said other gear means instantaneously meshing with diametrically oppositely located portions of the axially spaced apart first and second gear surfaces respectively; and eccentric means driven by said shaft for controlling the instantaneous engagement of the other gear means with the first and second gear surfaces, whereby the winding material passage, flyer arm, and eccentric means move in synchronism during every revolution of the flyer arm with an unobstructed winding material passage being maintained between the axially spaced apart first and second gear surfaces.]

[9. The structure of claim 8 wherein the other gear means includes a deformable spline supported for meshing engagement with the first and second gear surfaces.]

[10. The structure of claim 8 wherein the eccentric means includes a bearing structure having first and second bearing races with the first bearing race secured to the shaft, the other gear means comprises third and fourth gear surfaces fixed against relative motion and supported in oppositely facing relationship from the second bearing race; said bearing races being relatively movable about a second axis of rotation disposed at a preselected angle relative to the first axis of rotation, whereby the third and fourth gear surfaces execute a rotationless wobble motion as the shaft rotates.]

[11. The structure of claim 10 wherein the eccentric means includes first and second bearing races concentrically supported relative to a second axis of rotation and the first and second bearing races are supported from the shaft eccentrically relative to the first axis of rotation.]

*12. In apparatus for the winding of wire coils which can be drawn axially into a stator of an electric machine, the apparatus having form means onto which wire turns can be wound and from which wire turns can be transferred to a coil receiver; a rotatable flyer for winding wire about said form means; a coil receiver having at least one part thereof relatively movable axially into interfitting relation with said form means and onto which turns of wire can be transferred from the form means; means for effecting relative axial movement of the flyer and form means, and relative axial movement of at least part of the form means and coil receiver in a direction so that the coil receiver and form means relatively move axially toward one another with the coil receiver interfitting axially along the form means during movement of said flyer, and hence during the winding process; a rotatable hollow drive shaft for the flyer; and shaft means associated with the form means and disposed within the hollow shaft and inerconnected with the form means, the improvement comprising: annular gear means mounted eccentrically about the hollow shaft by at least one bearing, a first circumferentially extending gear, concentric with the axis of rotation for the hollow drive shaft, mounted non-rotatably on the apparatus and meshing with said annular gear means; a second circumferentially extending gear mounted non-rotatably relative to said form means and meshing with the annular gear means; and means connecting the hollow drive shaft and the flyer; said annular gear means preventing relative rotation of the form means and coil receiver while wire is being wound about the form means by the flyer, and yet permitting movement of wire to the flyer.*

*13. Apparatus for developing turns of winding material for ultimate assembly with a magnetic core, the apparatus including a machine frame; coil turn accommodating means; a device including shaping means, locked against rotation relative to the turn accommodating means for at least assisting in the formation of winding turns; a flyer*

*mechanism rotatable about the shaping means about a first axis of rotation for developing winding turns about the first axis of rotation; at least one winding material guide means for at least assisting in directing winding material from a first region to a second region spaced a different radial distance from the first axis than the first region; at least one nonrotating locking member; at least one movable locking mechanism interconnecting said nonrotating locking member and said device so that said device is locked against rotation about the first axis of rotation during movement of the flyer mechanism and for establishing an unobstructed passage, continuously movable along a predetermined path in synchronism with the flyer means, through which winding material may be fed from the first region to the second region; said locking mechanism including first and second gear surfaces spaced axially apart along the first axis of rotation; said mechanism providing a first wire path extending generally axially along the direction of the first axis and a second wire path extending from the first region to the second region; said shaping means having a portion for developing, in co-operation with the flyer means, a number of winding turns; said shaping means being movable axially relative to the turn accommodating means and to the nonrotating locking member; and means for effecting axial movement of the shaping means relative to the turn accommodating means during rotation of the flyer mechanism.*

*14. Apparatus for developing turns of winding material; the apparatus comprising: a machine frame; coil receiving means; winding turn placing means including a rotatable flyer assembly having a wire guiding portion rotatable in a predetermined path about a first axis for feeding winding material from a first region to a second region spaced a different radial distance from the first axis than the first region; form means movable axially relative to the flyer assembly during rotation thereof, and including a portion located axially beyond the second region; locking means for preventing rotation of the form means and permitting movement of winding material from the first region to the second region; said locking means including a first gear surface adapted to be held against rotation, a second gear surface interconnected with said coil form, and interconnected gear means extending a predetermined axial distance between the first and second gear surfaces; said first and second gear surfaces being spaced apart axially approximately the same distance as the predetermined axial distance, and the interconnected gear means instantaneously meshing with portions of the first and second gear surfaces; and means for causing axial movement of the form means relative to the flyer assembly, locking means, and coil receiving means, so that successively formed winding turns are moved successively into the receiving means during rotation of the wire guiding portion of the flyer assembly.*

*15. The invention of claim 14 wherein: the interconnected gear means comprises third and fourth gear surfaces interconnected together to prevent relative rotation therebetween; said first and second gear surfaces comprise first and second gears that extend circumferentially around the first axis, with the first axis passing through the geometric center for the first and second gears; said third and fourth gear surfaces are disposed circumferentially about a second axis; and wherein the second axis and first axis are oriented relative to one another so as to be noncoincident.*

*16. The invention of claim 14 wherein the interconnected gear means comprise third and fourth gear surfaces interconnected together to prevent relative rotation therebetween; said first and second gear surfaces extend circumferentially around the first axis, with the first axis centrally located relative to the first and second gear surfaces; said third and fourth gear surfaces are both disposed circumferentially about a second axis; and said third and fourth gear surfaces are supported in eccentric relation to the first axis.*

*17. The invention of claim 16 wherein the third and fourth gear surfaces move relative to the first axis as the flyer rotates.*

*18. The invention of claim 17 wherein the third and fourth gear surfaces are interconnected with the wire guiding portion of the flyer assembly, and move relative to the first axis as the flyer rotates.*

*19. The invention of claim 18 further including eccentric means movable in synchronism with the flyer, and wherein the location of interengagement of the third and fourth gear surfaces with the first and second gear surfaces, respectively, is controlled by the eccentric means.*

*20. In apparatus for the winding of wire coils which can be drawn axially into a stator of an electric machine, the apparatus having form means about which wire turns can be wound and from which wire turns can be transferred to a coil receiver; a rotatable flyer for winding wire about said form means; a coil receiver having at least one part thereof relatively movable axially relative to at least part of said form means and along which receiver at least some turns of wire of a given coil can be moved while at least one other turn of the same given coil is being formed about the form means; means for effecting relative axial movement of the flyer and the at least part of the form means, and for effecting relative axial movement of the at least part of the form means and the coil receiver in a direction so that the coil receiver and the at least part of the form means relatively move axially toward one another during movement of said flyer and hence during the winding process; and a drive shaft for the flyer rotatable about a first axis, the improvement comprising: gear means extending circumferentially about the first axis; a circumferentially extending gear mounted non-rotatably on the apparatus, concentric about the first axis, and meshing with said gear means; means interconnecting the gear means to said form means to prevent relative rotation therebetween; means interconnecting the drive shaft and the flyer; and eccentric means driven by the drive shaft for causing at least a portion of the gear means to engage the circumferentially extending gear; said gear means preventing relative rotation of the form means and coil receiver during relative axial movement of the coil receiver and at least part of the form means and while wire is being wound about the form means by the flyer, and yet permitting movement of wire to the flyer.*

*21. Apparatus for developing turns of winding material for ultimate assembly with a magnetic core, the apparatus including a machine frame, coil turn accommodating means, a device, including shaping means, locked against rotation relative to the turn accommodating means for at least assisting in the formation of winding turns; flyer means rotatable about the shaping means and about a first axis of rotation for developing winding turns about the shaping means; at least one winding material path along which winding material may move from a first region to a second region spaced a different radial distance from the first axis than the first region; at least one nonrotating locking member; movable locking means for establishing an unobstructed passage, continuously mov-*

*able along a predetermined path in synchronism with the flyer means, through which winding material may be fed from the first region to the second region; said movable locking means interconnecting said nonrotating locking member and said shaping means so that said shaping means is locked against rotation about the first axis of rotation during movement of the flyer mechanism; said apparatus further including eccentric means, and said locking means including at least one locking surface movable under the influence of the eccentric means; said locking means establishing a movable opening for the winding material path; said shaping means having a portion for developing, in co-operation with the flyer means, a number of winding turns; said shaping means having at least a portion thereof movable axially relative to the turn accommodating means and to the nonrotating locking member; and means for effecting axial movement of the at least a portion of the shaping means relative to the turn accommodating means during rotation of the flyer mechanism.*

* * * * *